United States Patent
Lapeyre

[11] 4,032,222
[45] June 28, 1977

[54] CONTROLLED REFLECTION READOUT FOR DIGITAL DISPLAYS

[75] Inventor: James M. Lapeyre, New Orleans, La.

[73] Assignee: Digicourse Inc., New Orleans, La.

[22] Filed: Mar. 26, 1976

[21] Appl. No.: 670,965

Related U.S. Application Data

[63] Continuation-in-part of Ser. No. 527,121, Nov. 25, 1974, abandoned.

[52] U.S. Cl. .............................. 350/276 R; 350/110
[51] Int. Cl.² ........................................ G02B 17/00
[58] Field of Search ......... 350/276 R, 284, 276 SL, 350/110–116; 340/282

[56] References Cited

UNITED STATES PATENTS

| | | | |
|---|---|---|---|
| 2,162,791 | 6/1939 | Shreve | 350/276 SL |
| 2,819,459 | 1/1958 | Dodd | 340/369 |
| 3,499,112 | 3/1970 | Heilmeir et al. | 178/7.7 |
| 3,531,178 | 9/1970 | Wirth | 350/113 |
| 3,566,602 | 3/1971 | Bergey et al. | 58/50 |
| 3,881,807 | 5/1975 | Hosokawa et al. | 350/160 LC |

*Primary Examiner*—John K. Corbin
*Assistant Examiner*—B. W. de los Reyes
*Attorney, Agent, or Firm*—Wilkinson, Mawhinney & Theibault

[57] ABSTRACT

The present disclosure is directed to a controlled reflection readout for light emitting information displays for such apparatus as computers, compasses, watches, clocks and consoles wherein the light emitting display is not placed normal to the viewing plane and cannot be read at 90° to the display. The light emitting display is inclined to the line of sight and glare shielding means extends forwardly from the top of the display to prohibit reading the display at a right angle thereto whereby reflections from the sun or lights in a room will interfere with reading through the optically transparent window in front of the light emitting display.

11 Claims, 10 Drawing Figures

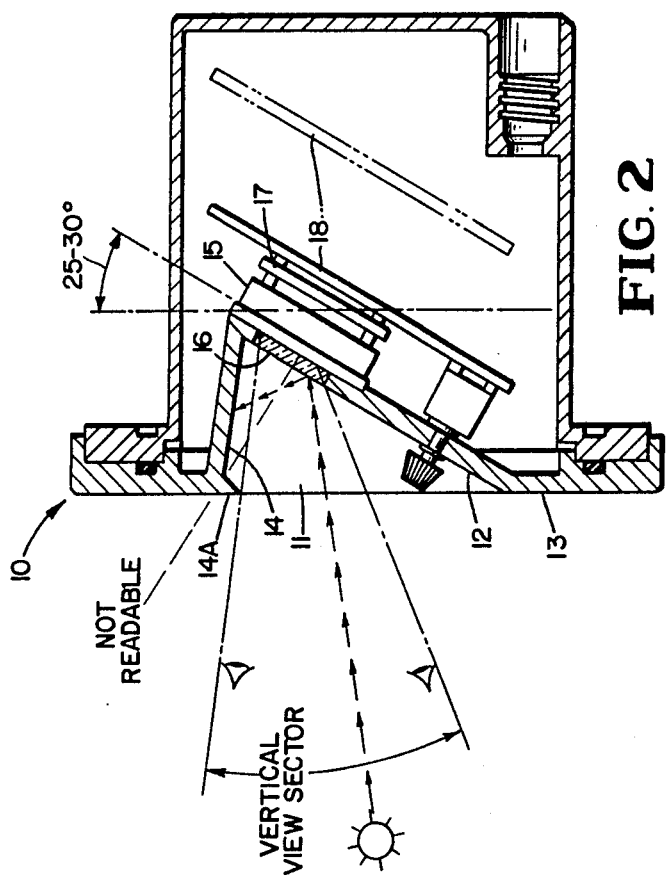
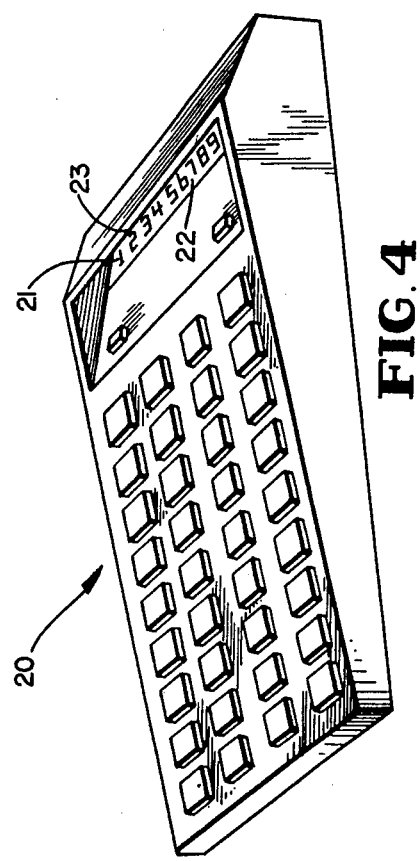
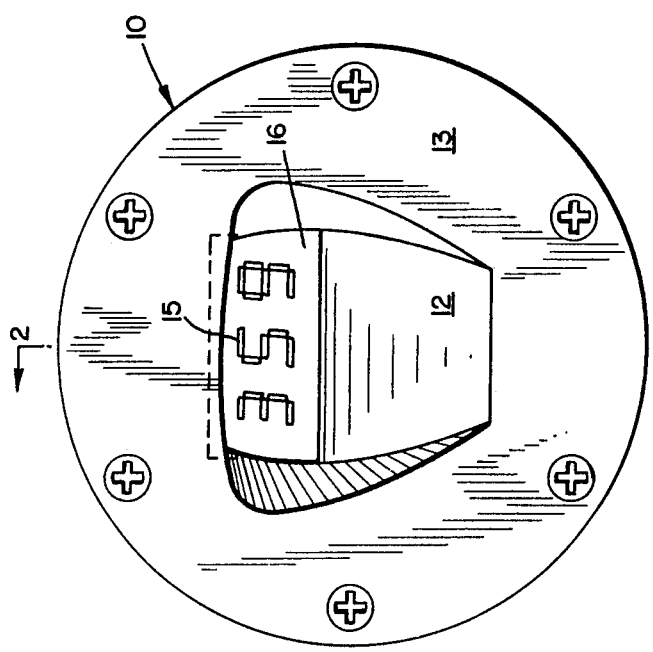
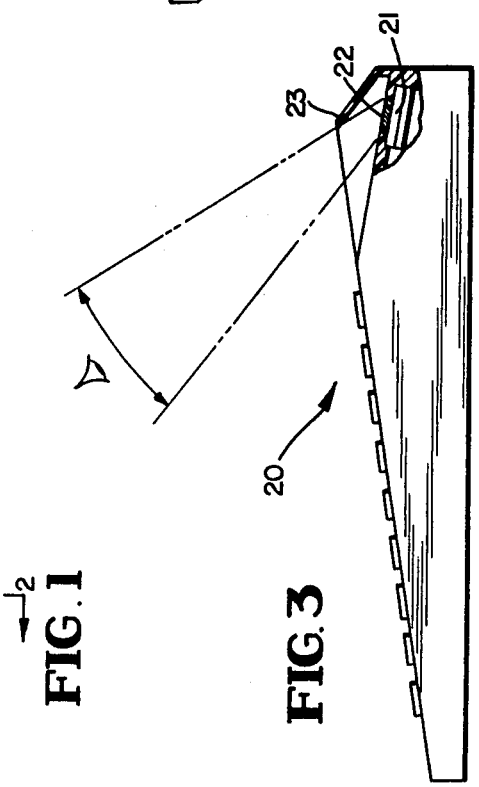

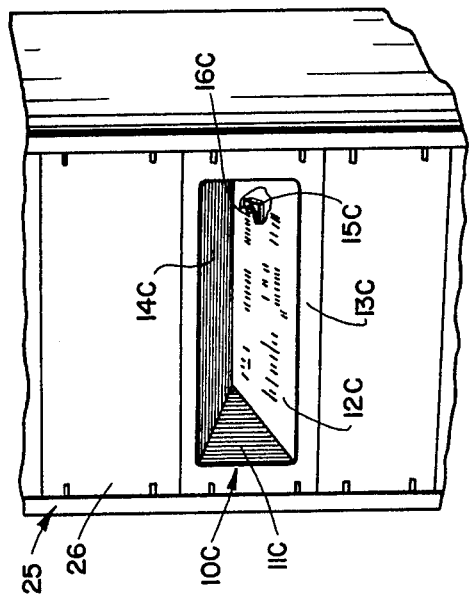
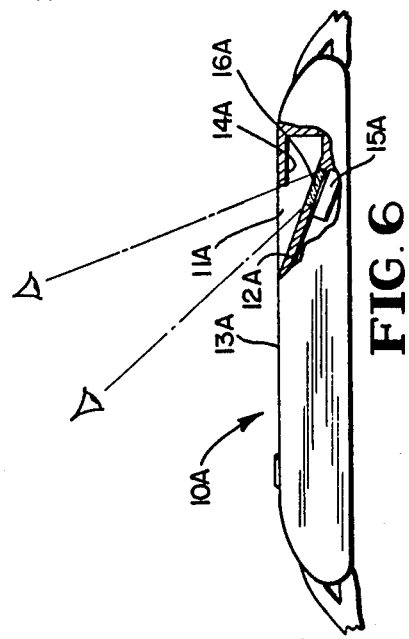
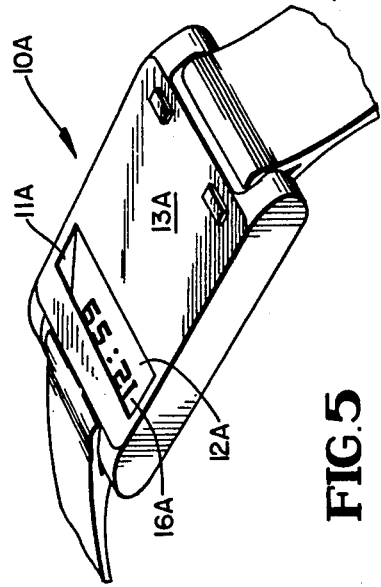
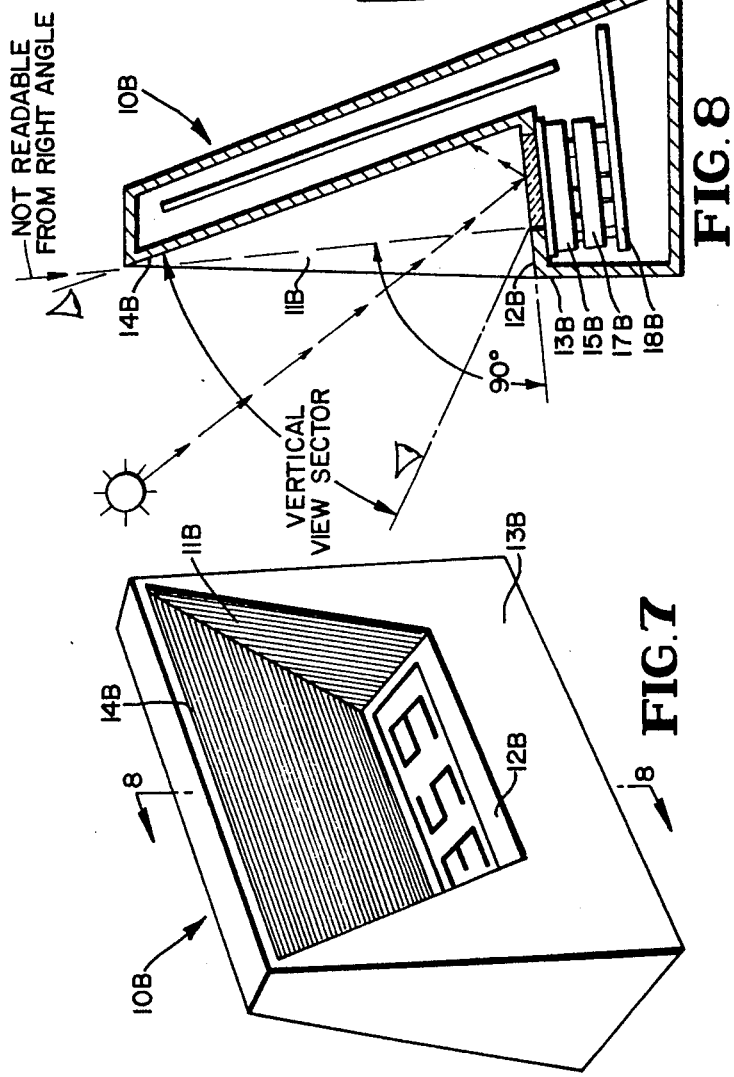
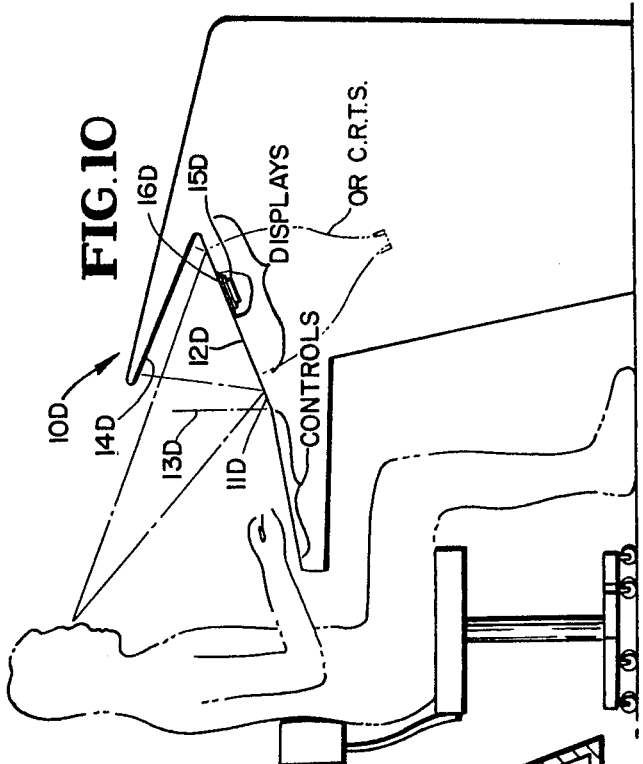

CONTROLLED REFLECTION READOUT FOR DIGITAL DISPLAYS

This application is a continuation-in-part of my similarly entitled application Ser. No. 527,121, filed Nov. 25, 1974 now abandoned.

An object of the present invention is the elimination of reflections on the front surface of an optically transparent window in front of a light emitting display particularly in the application of digital displays of compass readouts employed on sail boats or power craft where reflections are ever present from the sun and water.

A further object is to eliminate reflections being visible from the segments which make up the digital displays.

A further object of the present invention is the provision of a casement mounting for light emitting displays which cannot be read straight on or at a vision plane 90° to the plane of the light emitting readout.

A still further object of the present invention is the provision of a shielding means having a non-reflective external surface which will accentuate the visibility of the lights employed in the light emitting digital presentation due to its reflected light absorption characteristics.

With the foregoing and other objects in view the invention will be more fully described hereinafter and more particularly pointed out in the appended claims.

In the drawings in which like parts are denoted by reference characters throughout the several views:

FIG. 1 is a front elevational view of a controlled reflection readout casement having a light emitting digital display mounted for viewing therein.

FIG. 2 is a vertical section of the casement of FIG. 1 taken on the lines 2—2 in FIG. 1.

FIG. 3 shows a vertical section of the light emitting digital display portion of the computer of FIG. 4, taken at an enlarged scale.

FIG. 4 is a perspective view of a pocket computer having the controlled reflection readout of the present invention about its light emitting digital display.

FIG. 5 is a perspective view of a digital wrist watch casement constructed in accordance with the present invention.

FIG. 6 is a side elevational view of the watch casement of FIG. 5 with parts broken away and parts shown in section.

FIG. 7 is a perspective view of a digital clock constructed in accordance with the present invention.

FIG. 8 is a vertical sectional view taken on the line 8—8 in FIG. 7.

FIG. 9 is a front perspective view of the light emitting controlled reflection readout display of the present invention as applied to instrument rack assembly of readouts.

FIG. 10 is a side elevational view of a console and observer viewing the light emitting information readout of the present invention.

Referring now to the drawings, 10 designates a casement having an angular depression 11 in which is located front or readout face 12. The readout face 12 is at an angle of the order of 25° to 60° relative to the front plane of the front cover 13 of the casement 10. The upper surface 14 of the depression defines a blocking shield to prohibit reading the digital display 15 directly on or at an angle of 90° thereto. A drip lip 14A is provided to keep rain or water spray from entering the casement depression and fouling the optically transparent window 16 which is parallel to and in front of the digital display. The digital display 15 has a connector 17 and printed circuit board 18 for controlling the digital presentation.

One of the preferred forms of the invention finds application aboard sail boats or power boats where the helmsman steers the boat from the readings presented by the digital display and it is important to eliminate reflections from the sun and water to accentuate the visibility of the lights in the digital display and render them sharp and vivid.

Ideally the entire front cover 13 has a non-reflective surface.

Referring now to FIGS. 3 and 4, 20 designates a portable calculator having a digital readout 21 viewable through an optically transparent window 22. Forwardly of and above the window 22 is a shield 23 which cooperates with the angular positioning of the digital display and its parallel optically transparent window to render the digital incapable of being read straight on or with the line of vision at a right angle to the window 22 to thereby eliminate reflections of external objects from the surface of window 22. The angular positioning of the window 22 and digital display is the same 25° to 60° shown in FIG. 2.

Referring now to FIGS. 5 and 6, 10A designates a watch casement having an angular depression 11A in which is located its front or readout face 12A. The readout face is at an angle of the order of 25° to 60° relative to the front plane of the front cover 13A of the casement 10A. The upper surface 14A of the depression defines a blocking shield to prohibit reading the light emitting digital display 15A directly or on an angle of 90° thereto. An optically transparent window 16A is parallel to and in front of the light emitting digital display 15A. The blocking shield 14A has a non-reflective surface.

Referring now to FIGS. 7 and 8, 10B designates a clock casement having an angular depression 11B in its front readout face 12B at an angle relative to the front plane of the front cover 13B of the casement 10B. The upper surface 14B of the depression defines a blocking shield to prohibit reading the light emitting digital display 15B directly on or at an angle of 90° thereto. The digital display 15B has a connector 17B and printed circuit board 18B for controlling the digital presentation.

Referring now to FIG. 9, 25 designates a rack of instruments 26 having casements 10C having an angular depression 11C in which are located their front or readout faces 12C. The readout face is at an angle of the order of 25° to 60° relative to the front plane of the front cover 13C of the casement 10C. The upper surface 14C of the depression defines a blocking shield to prohibit reading the light emitting digital or alphanumeric display 15C directly or on an angle of 90° thereto. An optically transparent window 16C is parallel to and in front of the light emitting display 15C. The blocking shield 14C has a non-reflective surface.

Referring now to FIG. 10, 10D designates a console casement having an angular depression 11D in the front of the console readout face 12D. The readout face 12D is at an angle of the order of 25° to 60° relative to the front plane of the front cover 13D of the console 10D. The upper surface 14D of the depression defines a blocking shield to prohibit reading the light emitting information display 15D directly or on an angle of 90° thereto. An optically transparent window 16D is parallel to and in front of the light emitting display 15D or cathode ray tube as shown in FIG. 10. The blocking shield 14D has a non-reflective surface.

The light emitting display may be of the gaseous discharge tube type or the light emitting diode type.

What I claim is:

1. A self illuminated readout having a glare and reflection control for ambient light comprising:
  a. a casement having viewing opening therein for viewing inside a casement front plane,
  b. a light emitting display unit positioned inside said casement in view of said opening disposed in a second plane inclined at an angle of the order of 25° to 60° to said front plane, and
  c. view limiting shield means carried by said casing and positioned in the light path between the light emitting display and an observer so that the viewing angle is restricted to less than 90° relative to the plane of said display unit thereby to eliminate reflections of external objects from the display unit.

2. A self illuminated readout having a glare and reflection control for ambient light as claimed in claim 1 further comprising a window supported by the casement in said viewing opening positioned substantially parallel to the emitting surface of said light emitting display.

3. A self illuminated readout having a glare and reflection control for ambient light as claimed in claim 2 wherein the casement is a digital readout calculator.

4. A self illuminated readout having a glare and reflection control for ambient light as claimed in claim 2 wherein the casement is a watch casement.

5. A self illuminated readout having a glare and reflection control for ambient light as claimed in claim 2 wherein the casement is an array of stacked instruments.

6. A self illuminated readout having a glare and reflection control for ambient light as claimed in claim 2 wherein the casement is a console viewed by a seated person.

7. The readout defined in claim 1 having a glare absorbing means on the surface of said shield means extending inside said casement front plane.

8. A self-illuminated readout having a glare and reflection control for ambient light as claimed in claim 1 wherein the casement is a digital readout calculator.

9. A self-illuminated readout having a glare and reflection control for ambient light as claimed in claim 1 wherein the casement is a watch casement.

10. A self-illuminated readout having a glare and reflection control for ambient light as claimed in claim 1 wherein the casement encloses a cathode ray tube.

11. A self-illuminated readout havng a glare and reflection control for ambient light as claimed in claim 1 wherein the casement is a console viewed by a seated person.

* * * * *